United States Patent [19]

Moriya et al.

[11] Patent Number: 5,898,055
[45] Date of Patent: Apr. 27, 1999

[54] METHOD FOR PRODUCING METHYL METHACRYLATE POLYMER

[75] Inventors: Osamu Moriya; Koji Yano; Ikuo Morisada, all of Ehime, Japan

[73] Assignee: Sumitomo Chemical CO., LTD., Osaka, Japan

[21] Appl. No.: 08/999,328

[22] Filed: Dec. 29, 1997

[30] Foreign Application Priority Data

Dec. 26, 1996 [JP] Japan .................................. 8-348931

[51] Int. Cl.⁶ .................................................. C08F 2/38
[52] U.S. Cl. ........................... 526/224; 526/68; 528/492; 528/501
[58] Field of Search ...................... 526/68, 224; 528/492, 528/501

[56] References Cited

U.S. PATENT DOCUMENTS

| | | |
|---|---|---|
| 3,900,453 | 8/1975 | Shimada et al. . |
| 3,968,059 | 7/1976 | Shimada et al. . |
| 4,068,061 | 1/1978 | Nakagawa et al. . |
| 4,324,868 | 4/1982 | Maeda . |
| 4,711,938 | 12/1987 | Suka et al. ............................... 528/501 |
| 4,728,701 | 3/1988 | Jarvis et al. ............................. 528/501 |
| 5,068,313 | 11/1991 | Schiessl .................................. 528/492 |
| 5,171,833 | 12/1992 | Schiessl .................................. 528/492 |
| 5,728,793 | 3/1998 | Kumagai et al. ........................ 526/224 |

FOREIGN PATENT DOCUMENTS

| | | |
|---|---|---|
| 54-042035 | 1/1979 | Japan . |
| 60-135403 | 7/1985 | Japan ..................................... 528/501 |
| 3-111408 | 5/1991 | Japan . |
| 1234588 | 6/1971 | United Kingdom . |
| WO 86/07369 | 12/1986 | WIPO ..................................... 528/501 |

*Primary Examiner*—Bernard Lipman
*Assistant Examiner*—N. Sarofim
*Attorney, Agent, or Firm*—IP Group of Pillsbury Madison & Sutro, LLP

[57] ABSTRACT

The present invention provides a method for producing a methyl methacrylate polymer, wherein monomers containing methyl methacrylate as a main component are bulk-polymerized or solution-polymerized in the presence of a polymerization initiator and mercaptan compound as a chain transfer agent to form a liquid polymer composition containing unreacted monomers and then a volatile content is separated from the liquid polymer composition, the method comprising the steps of: distilling the volatile content to recover unreacted monomers, (1) subjecting the residue to a contact treatment with hydrazine compound or (2) subjecting the residue to an azeotropic distillation with water to remove impurities, distilling the resultant to recover the mercaptan compound and reusing the mercaptan compound as the chain transfer agent of raw materials.

5 Claims, 1 Drawing Sheet

METHOD FOR PRODUCING METHYL METHACRYLATE POLYMER

BACKGROUND OF THE INVENTION

1. Field of the Invention

The present invention relates to a method for producing a methyl methacrylate polymer. More particularly, it relates to a method for producing a methyl methacrylate polymer, including the step of recycling monomers and mercaptan compound as a chain transfer agent, the method comprising recovering a volatile content containing unreacted monomers from a methyl methacrylate polymer composition obtained by a bulk polymerization or solution polymerization method for methyl methacrylate, recovering mercaptan compound from the residue and using the mercaptan compound as a part of polymerization raw materials.

2. Description of the Related Art

As a polymerization method of a methyl methacrylate monomer, a batch suspension polymerization method using an aqueous medium has generally been used. Recently, there has been used a bulk polymerization or solution polymerization method, which is excellent in view of a problem of waste water disposal caused by the aqueous medium, productivity and energy.

As the bulk polymerization method, various methods are disclosed in Japanese Patent Kokoku Publication Nos. 52-32665, 59-21325, 59-21326, 1-49295, 2-26642 and Japanese Patent Kokai Publication No. 3-111408.

The solution polymerization method is disclosed in Japanese Patent Kokoku Publication No. 55-7845 and Japanese Patent Kokai Publication No. 58-132002.

In these polymerization methods, all monomers are not polymerized but the content of the polymer is from about 30 to 80% by weight and a liquid polymer composition comprising an unreacted monomer and a solvent is generally isolated from the polymerization system.

Japanese Patent Kokoku Publication No. 54-42035 discloses to reuse unreacted monomers and a part of impurities having a boiling point of not more than 200° C. Since mercaptan compound used as a chain transfer agent is high-boiling compound compared with the unreacted monomer, the mercaptan compound is generally discarded without recovering as described in Japanese Patent Kokai Publication No. 3-111408.

In such way, since an active component such as mercaptan compound as the chain transfer agent is contained in the residue formed after recovering monomers from the liquid polymer composition, it is discarded.

In view of a reduction in amount of the monomer and chain transfer agent to be used, it becomes necessary that the mercaptan compound is recovered from this residue and reused as the chain transfer agent of the raw material. However, when the mercaptan compound is continuously reused, impurities accumulate to exert a bad influence on polymerization itself and to cause coloring of the resulting polymer.

Therefore, the present inventors have intensively studied about a method for producing a methyl methacrylate polymer, which can efficiently remove impurities contained in the recovered mercaptan compound to perform purification and maintain the quality of the resulting polymer good even if the polymerization is continued for a long time. As a result, the present inventors have found that a methyl is methacrylate polymer having good quality can be obtained even if the polymerization is continued for a long time, by separating a volatile content from a liquid polymer composition to recover unreacted monomers, distilling the volatile content to recover unreacted monomers, (1) subjecting the residue to a contact treatment with hydrazine compound or (2) subjecting the residue to an azeotropic distillation with water to remove impurities, distilling the resultant to recover the mercaptan compound as the active component and reusing the mercaptan compound as a chain transfer agent of raw materials. Thus, the present invention has been accomplished.

SUMMARY OF THE INVENTION

An Object of the present invention is to provide a method for producing a methyl methacrylate polymer which has good quality and characteristics even if reuse of the recovered unreacted monomers and mercaptan compound as a chain transfer agent is continued for a long time in the continuous production of a methyl methacrylate polymer by the bulk polymerization or solution polymerization method.

That is, the present invention is as follows:

(1) a method for producing a methyl methacrylate polymer, wherein monomers containing methyl methacrylate as a main component are bulk-polymerized or solution-polymerized in the presence of a polymerization initiator and mercaptan compound as a chain transfer agent to form a liquid polymer composition containing unreacted monomers and then a volatile content is separated from the liquid polymer composition, the method comprising the steps of: distilling the volatile content to recover unreacted monomers, subjecting the residue to a contact treatment with hydrazine compound, distilling the resultant to recover the mercaptan compound and reusing the mercaptan compound as the chain transfer agent of raw materials; and (2) a method for producing a methyl methacrylate polymer, wherein monomers containing methyl methacrylate as a main component are bulk-polymerized or solution-polymerized in the presence of a polymerization initiator and mercaptan compound as a chain transfer agent to form a liquid polymer composition containing unreacted monomers and then a volatile content is separated from the liquid polymer composition, the method comprising the steps of: distilling the volatile content to recover unreacted monomers, subjecting the residue to an azeotoropic distillation with water to remove impurities, distilling the resultant to recover the mercaptan compound and reusing the mercaptan compound as the chain transfer agent of raw materials.

BRIEF DESCRIPTION OF THE INVENTION

FIG. 1 is a diagram illustrating a flow chart of the process of Example of the present invention.

DETAILED DESCRIPTION OF THE INVENTION

Figure 1:
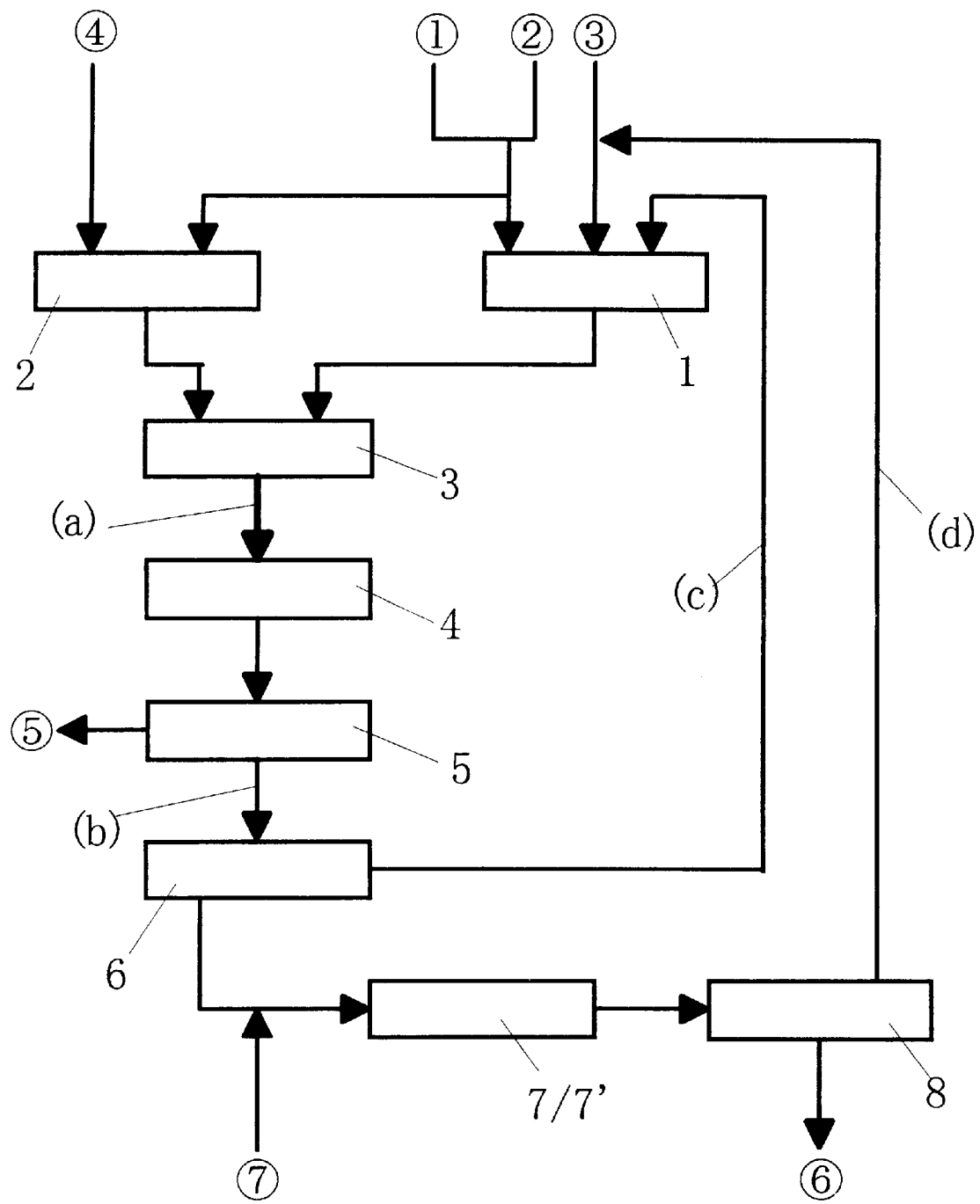

The present invention will be described in detail hereinafter.

The monomers containing methyl methacrylate as a main component in the present invention are methyl methacrylates or mixtures of methyl methacrylates and other vinyl monomers which are copolymerizable with methyl methacryaltes.

The methyl methacrylates may be those which are industrially produced, and examples thereof include those obtained by the acetone cyanhydrin method and those obtained by catalytically oxidizing isobutylene or tertiary butanol to form methacrylic acid and esterifying methacrylic acid with methanol.

The copolymerizable other vinyl monomers are methacrylates such as ethyl methacrylate, propyl methacrylate, butyl methacrylate, benzyl methacrylate, etc.; acrylates such as methyl acrylate, ethyl acrylate, propyl acrylate, butyl acrylate, 2-ethylhexyl acrylate, etc.; unsaturated carboxylic acids such as acrylic acid, methacrylic acid, maleic acid, itaconic acid, etc.; acid anhydrides such as maleic anhydride, itaconic anhydride, etc.; hydroxyl group-containing monomers such as 2-hydroxyethyl acrylate, 2-hydroxypropyl acrylate, monoglycerol acrylate, 2-hydroxyethyl methacrylate, hydroxypropyl methacrylate, monoglycerol methacrylate, etc.; nitrogen-containing monomers such as acrylamide, methacrylamide, acrylonitrile, methacrylonitrile, diacetone acrylamide, dimethylaminoethyl methacrylate, etc.; epoxy group-containing monomers such as allyl glycidyl ether, glycidyl acrylate, glycidyl methacrylate, etc.; and styrene monomers such as styrene, α-methylstyrene, etc.

A polymerization initiator used in the present invention may be those which are generally used, and is not specifically limited. Specific examples thereof include azo compounds such as azobisisobutyronitrile, azobisdimethylvaleronitrile, azobiscyclohexanitrile, 1,1'-azobis(1-acetoxy-1-phenylethane), dimethyl-2,2'-azobisisobutyrate, 4,4'-azobis-4-cyanovaleric acid, etc.; and peroxides such as benzoyl peroxide, lauroyl peroxide, 1,1-bis(t-butylperoxy)3,3,5-trimethylcyclohexane, acetyl peroxide, capryl peroxide, 2,4-dichlorobenzoyl peroxide, isobutyl peroxide, acetylcyclohexylsulfonyl peroxide, t-butylperoxy pivalate, t-butylperoxy-2-ethyl hexanoate, iso-propylperoxy dicarbonate, iso-butylperoxy dicarbonate, sec-butylperoxy dicarbonate, n-butylperoxy dicarbonate, 2-ethylhexylperoxy dicarbonate, bis (4-t-butylcyclohexyl) peroxy dicarbonate, t-amylperoxy-2-ethyl hexanoate, 1,1,3,3-tetramethylbutylperoxyethyl hexanoate, 1,1,2-trimethylpropylperoxy-2-ethyl hexanoate, t-butylperoxyisopropyl monocarbonate, t-amylperoxyisopropyl monocarbonate, 1,1,3,3-tetramethylbutylperoxyisopropyl monocarbonate, 1,1,2-trimethylpropylperoxyisopropyl monocarbonate, 1,1,3,3-tetramethylbutylperoxy isononanoate, 1,1,2-trimethylpropylperoxy isononanoate, t-butylperoxy benzoate, etc.

One or more kinds of these polymerization initiators, which are suitable for a predetermined polymerization temperature, may be used.

An amount of the polymerization initiator is from 0.0001 to 1% by weight based on the monomers.

When the amount is smaller than this range, the polymerization rate becomes slow. On the other hand, when the amount is larger than the range, the heat stability of the resulting polymer becomes inferior, unfavorably. Preferably, the amount is from 0.0001 to 0.1% by weight.

The bulk polymerization in the present invention is performed, for example, by the methods described in Japanese Patent Kokoku Publication Nos. 52-32665, 59-21325, 59-21326, 1-49295 and 2-26642 and Japanese Patent Kokai Publication No. 3-111408.

That is, the method may be a method of polymerizing monomers containing methyl methacrylate as a main component to give a liquid polymer composition containing unreacted monomers, and is not specifically limited.

In order to adjust the molecular weight of the resulting polymer, known monofunctional and polyfunctional chain transfer agents are used.

Examples thereof include alkyl mercaptan compound such as propylmercaptan, butylmercaptan, hexylmercaptan, octylmercaptan, 2-ethylhexylmercaptan, dodecylmercaptan, etc.; aromatic mercaptan compound such as phenylmercaptan, thiocresol, etc.; and thioglycol compound having 18 carbon atoms or less, such as ethylene thioglycol, etc.

These chain transfer agents may be used alone or in combination thereof.

An amount of the chain transfer agent is within the range from 0.01 to 3 parts by weight, preferably from 0.05 to 1 parts by weight, based on 100 parts by weight of the monomers. The amount within this range is preferable because good heat stability is maintained without deteriorating the mechanical properties of the polymer.

The solution polymerization in the present invention is also performed, for example, by the methods described in Japanese Patent Kokoku Publication No. 44-7845 and Japanese Patent Kokai Publication Nos. 58-132002 and 63-57613.

That is, the method may be a method of polymerizing monomers containing methyl methacrylate as a main component in the presence of a polymerization inert solvent to give a liquid polymer composition containing the solvent and unreacted monomers, and is not specifically limited.

The method of separating a volatile content comprising monomers and a solvent from a methyl methacrylate polymer in the liquid polymer composition includes, for example, the methods described in Japanese Patent Kokoku Publication Nos. 51-29914, 52-17555 and 1-53682 and Japanese Patent Kokai Publication Nos. 62-89710 and 3-49925.

That is, the liquid polymer composition is heated to evaporate a volatile content using a screw type vented extruder etc., thereby separating from the polymer.

The method of recovering the unreacted monomers from the volatile content separated after evaporation includes the methods described in Japanese Patent Kokoku Publication No. 54-42035 and Japanese Patent Kokai Publication No. 6-228203. That is, it is a method of removing a high-boiling content contained in the volatile content (e.g. low-polymerization degree polymers of dimer or oligomer, and chain transfer agent such as mercaptans, etc.) as the residue and recovering the unreacted monomers.

The residue obtained after recovering the unreacted monomers is subjected to a contact treatment with hydrazine compound.

In the contact treatment of the residue as the high-boiling content, all or a part of the residue is treated with hydrazine compound, continuously or intermittently. The selection is judged by the quality of the resulting polymer.

As the hydrazine compound, those having a boiling point higher than those of mercaptan compound are preferable and those having a boiling point of not less than 200° C. under normal pressure are preferable. Examples of the hydrazine compound include hydrazine (hydrate), phenylhydrazine, etc.

In order to subject the residue to the contact treatment with hydrazine compound, the residue and hydrazine compound may be sufficiently contacted with each other, and there may be any method of performing liquid-liquid mixing.

Examples thereof include a method of mixing in a vessel with a stirrer and a method of passing through a tower including a perforated plate or a packing.

A contact temperature is from about 5 to 80° C., preferably from normal temperature to 50° C. An amount of the hydrazine compound is from 0.001 to 0.005 kg based on 1 kg of the residue, and it should be decided by the amount of impurities formed. The treating temperature, treating time and amount of the hydrazine compound should not be limited, specifically.

Then, the mercaptan compound is separated from the resultant which was subjected to a contact treatment with hydrazine compound. This separation method is not specifically limited, and is generally separated by single distillation or distillation using a plate tower or a packed tower.

In place of the contact treatment with hydrazine compound, the mercaptan compound may be separated by performing the distillation in the same manner as described above after subjecting the residue to an azeotropic distillation with water to remove impurities.

According to these methods, 30 to 100% of the mercaptan compound contained in the residue are recovered.

The recovered mercaptan compound is reused as the chain transfer agent of raw materials.

According to the present invention, when a methyl methacrylate polymer is continuously produced by a bulk polymerization or solution polymerization method, even if reuse of the recovered unreacted monomers and mercaptan compound is continued for a long time, impurities derived from the raw material and polymerization reaction do not accumulate, thereby making it possible to produce a methyl methacrylate polymer having good quality and characteristics.

EXAMPLES

The present invention will be described in detail by the following Examples which do not limit the present invention.

The evaluation method of the resulting polymer is as follows.

(1) Measurement of melt flow rate (MFR):

It was measured by using a melt indexer manufactured by Takara Kogyo Co., Ltd. under the conditions of a temperature of 230° C. and a load of 3.8 kg according to JIS-K7210.

(2) Measurement of coloring degree:

Using an extruder (having a screw diameter of 40 mm) with a T-die (manufactured by Tanabe Plastic Co., Ltd.), plate extrusion was performed at a temperature of 250° C. and an extruded plate having a thickness of 3 mm was obtained by passing through three polishing rolls at about 100° C.

A plate-like sample having a size of 5 cm×5 cm was cut from this extruded plate, and an yellowness index (YI) was measured by using a spectral color difference meter manufactured by Nippon Denshoku Kogyo Co., Ltd. according to JIS-K7103.

(3) Weathering properties:

The same plate-like sample as that used in the measurement of the coloring degree was exposed to light at a black panel temperature of 63° C. for 2000 hours, and then YI was measured by using a sunshine weatherometer (Model WE-SUN-HCS-1, manufactured by Suga Shikenki Co., Ltd.). The measured value was used for evaluation of the weathering properties.

Example 1

A flow chart of the process used in Example is shown in FIG. 1.

A schematic specification of principal devices is as follows.

Monomer preparation vessel 1: 20 L, SUS304, equipped with a puddle blade stirrer and a jacket Catalyst dissolution vessel 2: 10 L, SUS304, equipped with a puddle blade stirrer and a jacket Polymerization reaction vessel 3: 10 L, SUS304, equipped with a helical ribbon blade stirrer and a jacket Heater 4: 16.7 mm in inner diameter×3 m in length, equipped with a jacket Vented extruder 5: twin-screw extruder (TEX-30) manufactured by Nippon Seikosho Co., Ltd., different direction revolution system, screw diameter of 30 mm, length of cylinder of 1200 mm, equipped with one rear vent and three fore vents Monomer recovery tower 6: inner diameter of 100 mm, length of 3 m, SUS304, ⅜ inch SUS Rashig ring packed tower, length of concentration portion of 0.7 m, length of recovery portion of 0.3 m Hydrazine treatment vessel 7: 3 L, made of resin, equipped with a stirrer and no jacket Azeotropic distillation tower 7': inner diameter of 30 mm, length of 300 mm, made of glass, no packing Mercaptan recovery tower 8: inner diameter of 30 mm, length of 300 mm, made of glass, Dikson packing packed tower, length of recovery portion of 120 mm As the raw monomer, methyl methacrylate ① (hereinafter referred to as MMA) manufactured by Nippon Methacryl Monomer Co., Ltd. and methyl acrylate ② (hereinafter referred to as MA) manufactured by Toa Gosei Cc., Ltd. were used. As the polymerization initiator, 1,1-bis (t-butylperoxy)3,3,5-trimethylcyclohexane ④ (hereinafter referred to as CY) was used. As the chain transfer agent, n-octylmercaptane ③ (hereinafter referred to as OM) was used.

MMA, MA (3.5% by weight) and CY (0.26%) were charged in a catalyst dissolution vessel 2, followed by mixing with stirring to completely dissolve CY, thereby to form a catalyst solution.

A refrigerant was passed through a jacket so that the temperature inside the catalyst dissolution vessel becomes 5° C.

The catalyst solution thus prepared was continuously fed to a polymerization reaction vessel 3 at a rate of 1.5 kg/hr using a pump.

An amount of MMA, MA and OM to be further fed, an amount of the unreacted monomer to be recycled and its composition were adjusted so that the concentration of MMA MA and OM in the monomer preparation vessel 1 become 96.3% by weight, 3.5% by weight and 0.14% by weight, respectively.

A refrigerate was passed through a jacket with stirring so that the temperature inside the monomerpreparation vessel becomes 5° C. The monomer mixed solution thus prepared was continuously fed to the polymerization reaction vessel at a rate of 13.3 kg/hr using a pump.

The above catalyst solution and monomer mixed solution were fed from the lower portion of the polymerization reaction vessel and were polymerized at a temperature of 175±2° C. for an average retention time of 26 minutes to an average polymerization degree of 56% by weight. The resulting liquid polymer composition (a) was discharged from the upper portion of the polymerization reaction vessel and then lead to a heater 4.

In the heater, a heating medium was passed through a jacket and the liquid polymer composition was heated to 200° C. (20 kg/cm²G). Then, the liquid polymer composition was lead to a vented extruder 5.

The liquid polymer composition was treated by adjusting the pressure of each vent to reduced pressure and adjusting the cylinder temperature to about 250° C. in the vented extruder. A volatile content(b) containing the unreacted monomer as the main component was discharged from the vent and then transferred to the following monomer recovery tower 6. The polymeric (5) was removed in the form of a molten strand. After water cooling, the strand was finely cut into pellets at an average rate of 8.26 kg/hr.

The volatile content discharged from the rear vent of the vented extruder was fed to the recovery portion of a monomer recovery tower in the form of a gas. The volatile content discharged from the fore vents of the vented extruder was cooled and concentrated to form a liquid, which was fed to the bottom portion of the monomer recovery tower and then continuously distilled at a reflux ratio of 1.

A distilled solution discharged from the top of the monomer recovery tower was recycled to the monomer preparation vessel as the unreacted monomers (c). The residue containing OM was drawn from the bottom of the monomer recovery tower at an average rate of 112 g/hr.

Incidentally, hydroquinone as a polymerization inihibitor was continuously fed from the top of the monomer recovery tower at a rate of about 0.5 g/hr.

The residue containing OM is in the form of a liquid, and this residue was subjected to contact mixing with hydrazine hydrate (7) in a hydrazine treatment vessel 7. The resultant was fed to the top of a mercaptan recovery vessel 8 and then continuously distilled.

The distilled solution discharged from the top of the mercaptan recovery tower was fed to the monomer preparation vessel as a recovery OM(d). With respect to the composition of the distilled solution, the content of OM, MMA, MMA dimer were 20%, 50% and 10% or less, respectively.

Almost 100% of the unreacted OM could be recovered.

A waste solutions (6) containing a dimer and a product of the reaction between the hydrazine compound and impurities was drawn from the bottom of the mercaptan recovery tower 8.

Using the recovered OM obtained by the above operation, a pilot test of continuous bulk polymerization was performed and the resulting polymer was evaluated.

The melt flow rate was 2.8, the coloring degree was 0.4 and the value of weathering properties was 0.9, which were the same values as those obtained in case of using only fresh OM.

Example 2

In the same manner as in Example 1 except that azeotropic distillation of the residue with water is performed by using the azeotropic distillation tower 7' in place of the contact treatment with hydrazine compound by using the hydrazine treatment vessel 7, a polymer was produced.

That is, the residue containing OM drawn from the bottom of the monomer recovery tower 6 was fed to the bottom of an azeotropic distillation tower 7' and then water was added to perform continuous distillation. After impurities, which are azeotropic with water, were removed by distillation, the resultant containing OM was fed to the top of the mercaptan recovery tower 8 and OM was recovered from the top.

The polymer obtained by continuous bulk polymerization was evaluated. As a result, the melt flow rate was 2.7, the coloring degree was 0.4 and the value of weathering properties was 0.9.

Comparative Example 1

In the same manner as in Example 1 except for feeding the residue containing OM discharged from the bottom of the monomer recovery tower 6 to the mercaptan recovery tower 8 as it is without subjecting to the contact treatment with hydrazine compound, a polymer was produced.

The polymer obtained by continuous bulk polymerization was evaluated. As a result, the melt flow rate was 2.7, the coloring degree was 1.0 and the value of weathering properties was 2.1. That is, a bad influence was exerted on the quality of the resulting polymer, particularly coloring degree.

In this case, impurities as a decomposition product from a polymerization initiator CY accumulated in the system and it became impossible to recycle the chain transfer agent.

What is claimed is:

1. A method for producing a methyl methacrylate polymer, wherein monomers containing methyl methacrylate as a main component are bulk-polymerized or solution-polymerized in the presence of a polymerization initiator and mercaptan compound as a chain transfer agent to form a liquid polymer composition containing unreacted monomers and then a volatile content is separated from the liquid polymer composition, said method comprising the steps of:

distilling the volatile content to recover unreacted monomers, subjecting the residue to a contact treatment with hydrazine compound, distilling the resultant to recover the mercaptan compound, and reusing the mercaptan compound as the chain transfer agent of raw materials.

2. A method for producing a methyl methacrylate polymer, wherein monomers containing methyl methacrylate as a main component are bulk-polymerized or solution-polymerized in the presence of a polymerization initiator and mercaptan compound as a chain transfer agent to form a liquid polymer composition containing unreacted monomers and then a volatile content is separated from the liquid polymer composition, said method comprising the steps of distilling the volatile content to recover unreacted monomers, subjecting the residue to an azeotropic distillation with water to remove impurities, distilling the resultant to recover the mercaptan compound, and reusing the mercaptan compound as a chain transfer agent of raw materials.

3. A method according to claim 1, wherein said hydrazine compound is hydrazine hydrate.

4. A method according to claim 1, wherein the amount of the hydrazine compound contacted with the residue is from 0.001 to 0.005 kg based on 1 kg of the residue.

5. A method according to claim 1 or 2, wherein said mercaptan compound is n-octylmercaptan.

* * * * *